US007980199B2

(12) United States Patent
Kleinsasser

(10) Patent No.: US 7,980,199 B2
(45) Date of Patent: Jul. 19, 2011

(54) CONTAINMENT APPARATUS FOR CONTAINING GESTATING SOWS

(75) Inventor: Jonathan Kleinsasser, Manitoba (CA)

(73) Assignee: Crystal Spring Colony Farms Ltd, Ste. Agathe, Manitoba (CA)

( * ) Notice: Subject to any disclaimer, the term of this patent is extended or adjusted under 35 U.S.C. 154(b) by 0 days.

(21) Appl. No.: 12/844,880

(22) Filed: Jul. 28, 2010

(65) Prior Publication Data
US 2011/0017146 A1     Jan. 27, 2011

Related U.S. Application Data

(62) Division of application No. 11/759,018, filed on Jun. 6, 2007, now Pat. No. 7,861,675.

(60) Provisional application No. 60/921,504, filed on Apr. 24, 2007.

(51) Int. Cl.
*A01K 1/10*     (2006.01)
*A01K 29/00*     (2006.01)
(52) U.S. Cl. ........................................................ 119/521
(58) Field of Classification Search .................. 119/521,
119/520, 522, 523, 515, 840, 14.18
See application file for complete search history.

(56) References Cited

U.S. PATENT DOCUMENTS

| 4,138,968 | A  | * | 2/1979  | Ostermann  | 119/842 |
| 4,854,268 | A  | * | 8/1989  | Kipe       | 119/14.03 |
| 6,182,610 | B1 | * | 2/2001  | Tripp et al. | 119/450 |
| 6,622,651 | B1 | * | 9/2003  | Dessing    | 119/14.08 |
| 7,444,961 | B1 | * | 11/2008 | Ellis      | 119/842 |
| 7,607,405 | B2 | * | 10/2009 | Pratt      | 119/51.02 |

* cited by examiner

*Primary Examiner* — Yvonne R. Abbott
(74) *Attorney, Agent, or Firm* — Adrian D. Battison; Ade & Company Inc.

(57) ABSTRACT

Gestating sows are housed in a series of gestation stalls arranged in a row and backing onto an open alley along a rear of the row of stalls into which the sow can enter by backing out of the stall. A common trough extends along the front of the stalls and is fastened to the floor by fasteners which connect trough sections end to end. The common trough provides a support for the front end of the side walls defining the stalls. A rear gate closes the rear of each stall and connects to a front gate of the stall operable to close the rear gate by the sow as it moves in the stall toward the front. The rear gate latches closed to prevent entry of another sow but is releasable by rear pressure on the rear gate from the sow backing out.

8 Claims, 10 Drawing Sheets

# CONTAINMENT APPARATUS FOR CONTAINING GESTATING SOWS

This application is a divisional application of application Ser. No. 11/759,018 filed Jun. 6, 2007 and now issued as U.S. Pat. No. 7,861,675

This application claims under 35 U.S.C. 119 the benefit of the filing date of Provisional Application No. 60/921,504 filed Apr. 24, 2007.

This invention relates to a containment apparatus for containing gestating sows.

SUMMARY OF THE INVENTION

In the management of hog farming, gestating sows are conventionally kept in individual pens or stalls with little opportunity for movement. It has become more desirable to provide the opportunity for the sows to move and to have opportunity for exercise so that it is desirable to provide an arrangement in which the animals can move from place to place but are properly managed both in regard to their feed intake and in regard to their well being.

It is one object of the invention to provide a containment apparatus for containing gestating sows which allows the sows more freedom to move from containment stalls in a common area at the rear of the stalls.

According to a first aspect of the invention there is provided a containment apparatus for containing gestating sows comprising:

a series of gestation stalls arranged in a row defined by a series of parallel side walls;

each stall having a front closure panel for closing the side walls to form an enclosure shaped and dimensioned substantially to receive a single sow;

an open alley along a rear of the row of stalls into which the sow can enter by backing out of the stall with the rear gate open so that the sows are free to move in the open alley at their volition and to enter the stalls through the rear entry;

a trough at the front of the stall for providing feed for the sow in the stall;

wherein the trough at the front of at least some of the stalls forms a common trough member extending across the stalls;

wherein the trough member is fastened to a floor surface; and wherein the side walls of some of the stalls are attached to and supported by the common trough member.

According to a second aspect of the invention there is provided a containment apparatus for containing gestating sows comprising:

a series of gestation stalls arranged in a row defined by a series of parallel side walls;

each stall having a front closure panel for closing the side walls to form an enclosure shaped and dimensioned substantially to receive a single sow;

an open alley along a rear of the row of stalls into which the sow can enter by backing out of the stall with the rear gate open so that the sows are free to move in the open alley at their volition and to enter the stalls through the rear entry;

a trough at the front of the stall for providing feed for the sow in the stall;

wherein the trough at the front of at least some of the stalls forms a common trough member extending across the stalls;

wherein the trough member is fastened to a floor surface;

and wherein the common trough member is formed from a plurality of trough sections connected end to end along the trough member and wherein each trough section is fastened to the next by fasteners which extend through the trough sections and engage into the floor to fasten the trough member to the floor.

According to a third aspect of the invention there is provided a containment apparatus for containing gestating sows comprising:

a first series of gestation stalls arranged in a row defined by a series of parallel side walls arranged to form a series of enclosures shaped and dimensioned substantially to receive a single sow;

a first open alley along a rear of the row of stalls of the first series into which the sow can enter by backing out of the stall with the rear gate open so that the sows are free to move in the first open alley at their volition and to enter the stalls of the first series through the rear entry;

a first trough at the front of the stalls of the first series for providing feed for the sow in the stall;

a second series of gestation stalls arranged in a row defined by a series of parallel side walls arranged to form a series of enclosures shaped and dimensioned substantially to receive a single sow;

a second open alley along a rear of the row of stalls of the second series into which the sow can enter by backing out of the stall with the rear gate open so that the sows are free to move in the second open alley at their volition and to enter the stalls of the first series through the rear entry;

a second trough at the front of the stalls of the first series for providing feed for the sow in the stall;

the first series of stalls being arranged facing the second series of stalls such that the front of the first series butts with the front of the second series at a junction therebetween so that the first and second rear alleys are opposed and spaced by the two series of stalls;

a divider member located between the front of the first stalls and the front of the second stalls at the junction therebetween to maintain the sows therein separate;

and a walkway elevated above the floor located along the junction between first and second series of stalls.

This arrangement has the advantage that the raised walkway avoids the necessity for an alley between the two series of stalls at the front end thus maximizing the space available for the rear alley and/or allowing the apparatus to be used in a space conventionally used for gestation stalls which do not use the rear alley system.

Preferably the walkway is supported on the side walls of the stalls so as to bridge the junction between the stalls and sit partly on the first series and partly on the second series.

Preferably the side walls of the stalls have a reduced height section at the junction on which the walkway is supported.

Preferably the walkway is supported at a height lower than a top rail of the side walls of the stalls.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
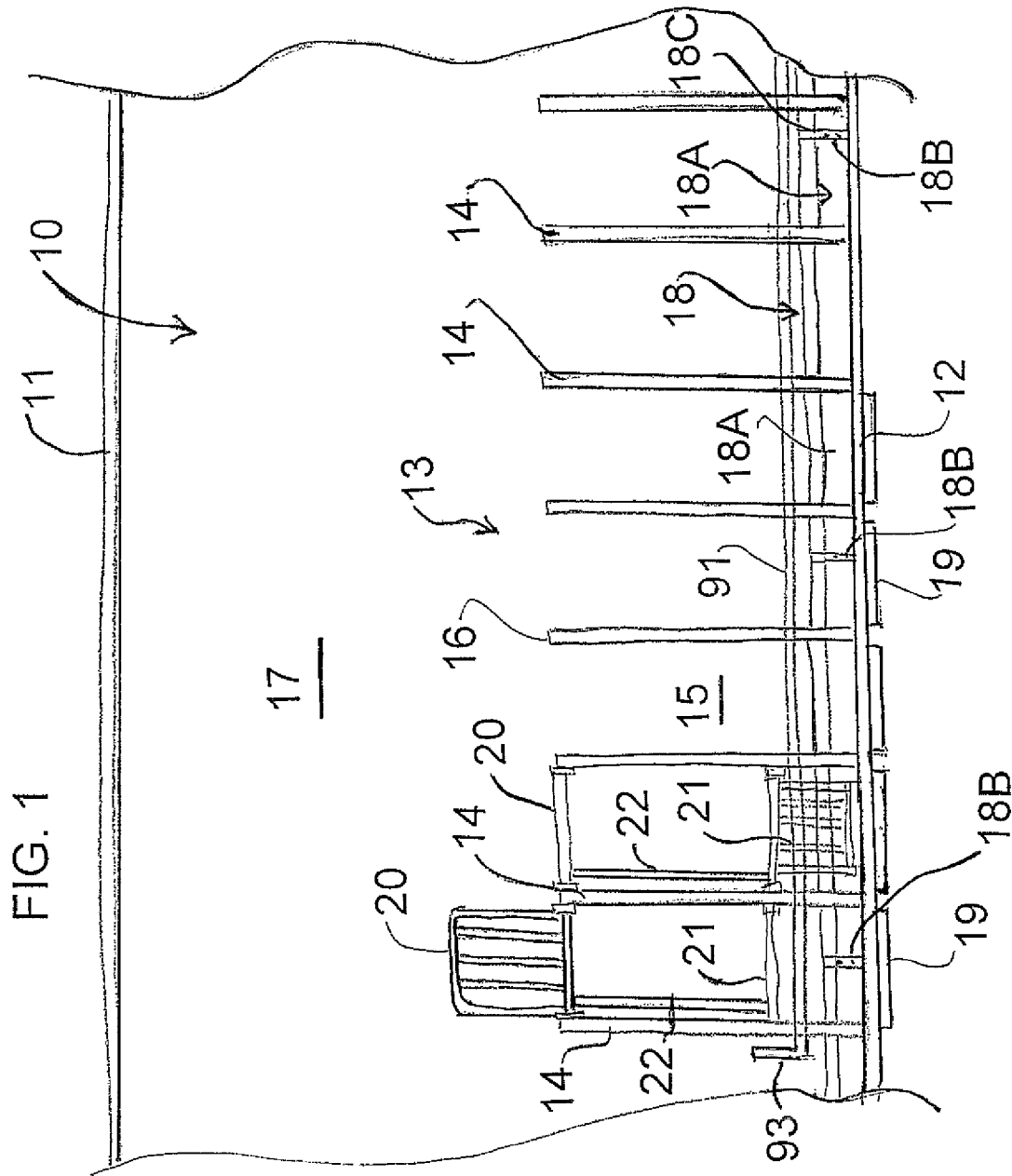
FIG. 1 is a schematic top plan view of a containment apparatus according to the present invention including a series of side by side stalls.

In FIG. 1 is shown a containment apparatus for receiving a plurality of sows in a manner which allows the sows the opportunity to be contained within an individual stall and the opportunity to enter into a common area where the sows can move freely and interact. The apparatus comprises walls defining a penning area 10 including a rear wall 11 and two side walls (not shown). At a front of the pen defined by a front rail 12 is provided a series of stalls 13 arranged in a row across the front rail 12. The stalls are defined by a series of side walls 14 which are arranged at spaced positions along the length of the containment area 10 so as to define between each side wall and the next a respective stall 15 for receiving an individual sow. The side walls 14 extend to a rear end 16 with the rear ends arranged in a row and spaced from the rear wall 11 to define a common area 17.

Along the front rail is defined a common trough 18 which extends substantially along the full length of the front rail 12 so as to provide a trough portion 18A in each of the stalls 15 so that the sows can receive a delivered quantity of feed within that portion 18A of the trough 18 which is located within a respective stall. Each stall is closed at its front end by a closure panel 19 at the rail 12 so that the sow is prevented from stepping over the trough and escaping through the front of the stall. Thus in normal operating conditions the sows are contained within the containment area 10 by the front closure panels 19 and by the rear wall 11. If it is required to move one or more sows, that sow can be removed from a stall by opening the front closure panel 19.

The walls of the containment area are of course manufactured from horizontal rails and vertical bars in conventional manner so as to contain the animals within the area using simply and conventionally manufactured framing components. However the wall 11 and the side walls which are not shown may comprise side walls of the building and be suitably constructed using conventional materials.

Each of the stalls 15 includes a rear gate 20 and a front panel 21. As shown in respect of the first two of the stalls 15, these elements are connected by a link 22 so that they move in co-operation so that the rear gate 20 can be moved to a raised opened position as shown in the first stall into a downwardly extending closed position as shown in the second stall with a link 22 causing the front panel 21 to move correspondingly from a downwardly depending position shown at the first stall to an upward forwardly extending position shown at the second stall. The rear gate and the front panel are omitted from the remaining stalls of FIG. 1 for convenience of illustration.

Figure 2:
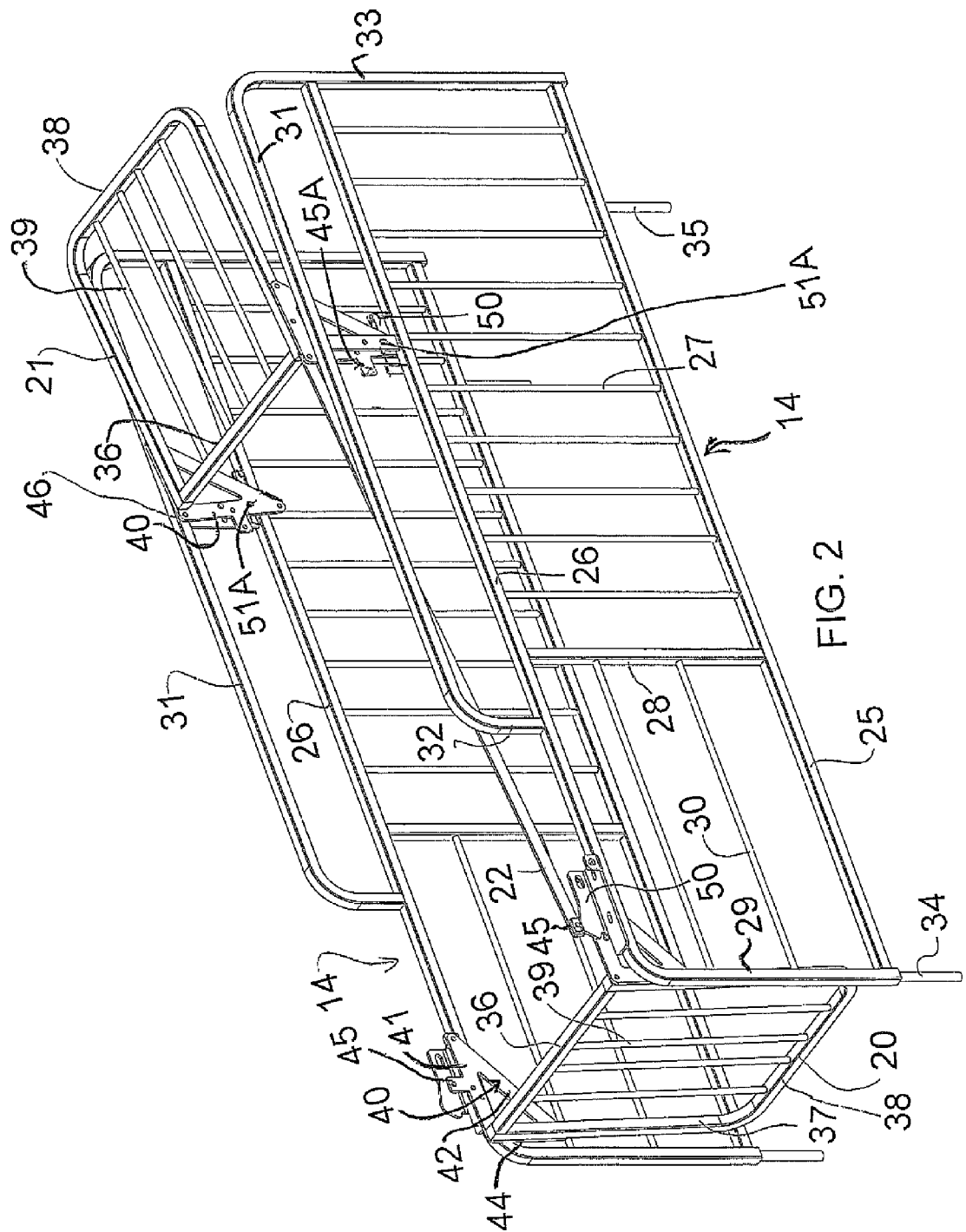
FIG. 2 is an isometric view of one stall of the apparatus of FIG. 1 showing the rear gate in the open position and showing the stall mounted separately from the trough.
Figure 3:
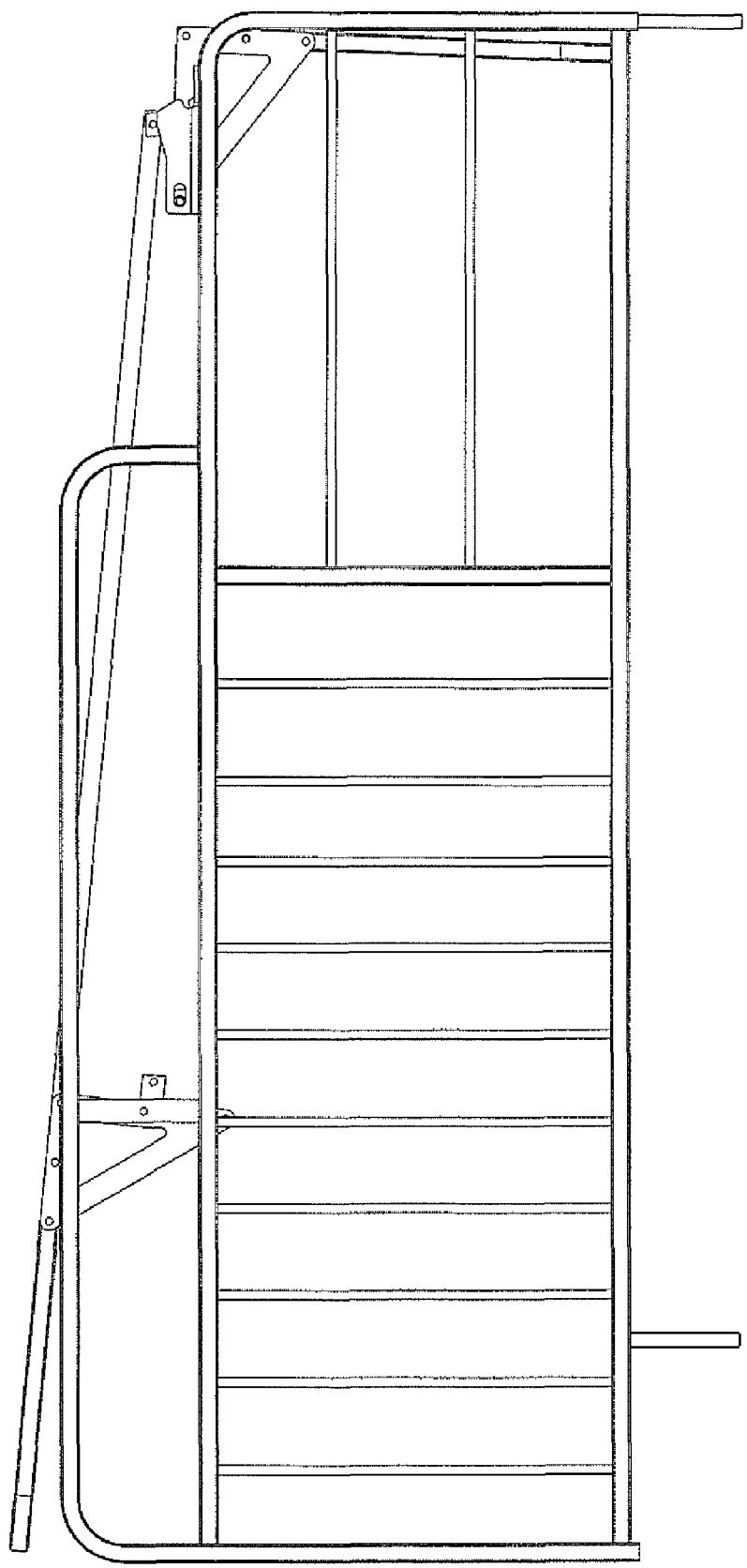
FIG. 3 is a side elevational view of the stall of FIG. 2.

Turning now to FIG. 2, one of the stalls is shown in more detail and comprises a bottom longitudinal rail 25, a top rail 26 and a plurality of vertical bars 27. At a rear section of the side wall 14 is provided a vertical post 28 parallel to a rear post 29 and defining horizontal rails 30 therebetween. This allows access to the sow within the stall at the rear for attention by a supervising person. The vertical posts 27 at the forward end provide more confinement to the animal giving it the greater impression of being confined with less opportunity to escape. An uppermost rail 31 parallel to the top rail 26 is located above the area of the vertical posts to provide an increase height in that area again acting to constrain the animal more effectively. The uppermost rail 31 connects to the top rail 26 at a rear depending end 32 and at the forward end curves downwardly to form a front post 33 which connects to the bottom rail 25.

In the embodiment shown in FIG. 2, the rear post 29 is supported on a rear leg 34 which supports the bottom rail at a position spaced from the floor of the containment area. Also in this embodiment is provided a front leg 35 connected between the floor and the bottom rail 25 at a position spaced rearwardly of the front post 33.

The rear gate 20 is shown in the vertical closed position and the front panel 21 is in the raised position. It will be appreciated that pivotal movement of the rear gate to the horizontal raised position acts to pull the front gate or front panel 21 downwardly into a vertical lowered position by actuating common movement through the link 22. The rear gate 20 and the front panel 21 are substantially symmetrical and each comprises a top rail 36, a U-shaped rail member 37 which extends vertically downwardly on each side and turns into a horizontal bottom rail piece 38 to form a generally rectangular panel together with a plurality of vertical bars 39 which interconnect the top rail 36 and the bottom rail piece 38. This generally rectangular panel is attached to a triangular mounting bracket generally indicated at 40. The triangular mounting bracket includes a first side 41 and an inclined second side 42 which extends to the vertical post at the side of the panel. Alongside the post is mounted a third side 44 of the triangular bracket. The triangular bracket is mounted on the top rail 26 for pivotal movement about a horizontal axis allowing the movement from the vertical depending position to the horizontal raised position. The link 22 extends from a tab 45 on the first side 41 at the rear gate to the apex 46 of the triangular bracket at the front panel 21.

Figure 7:
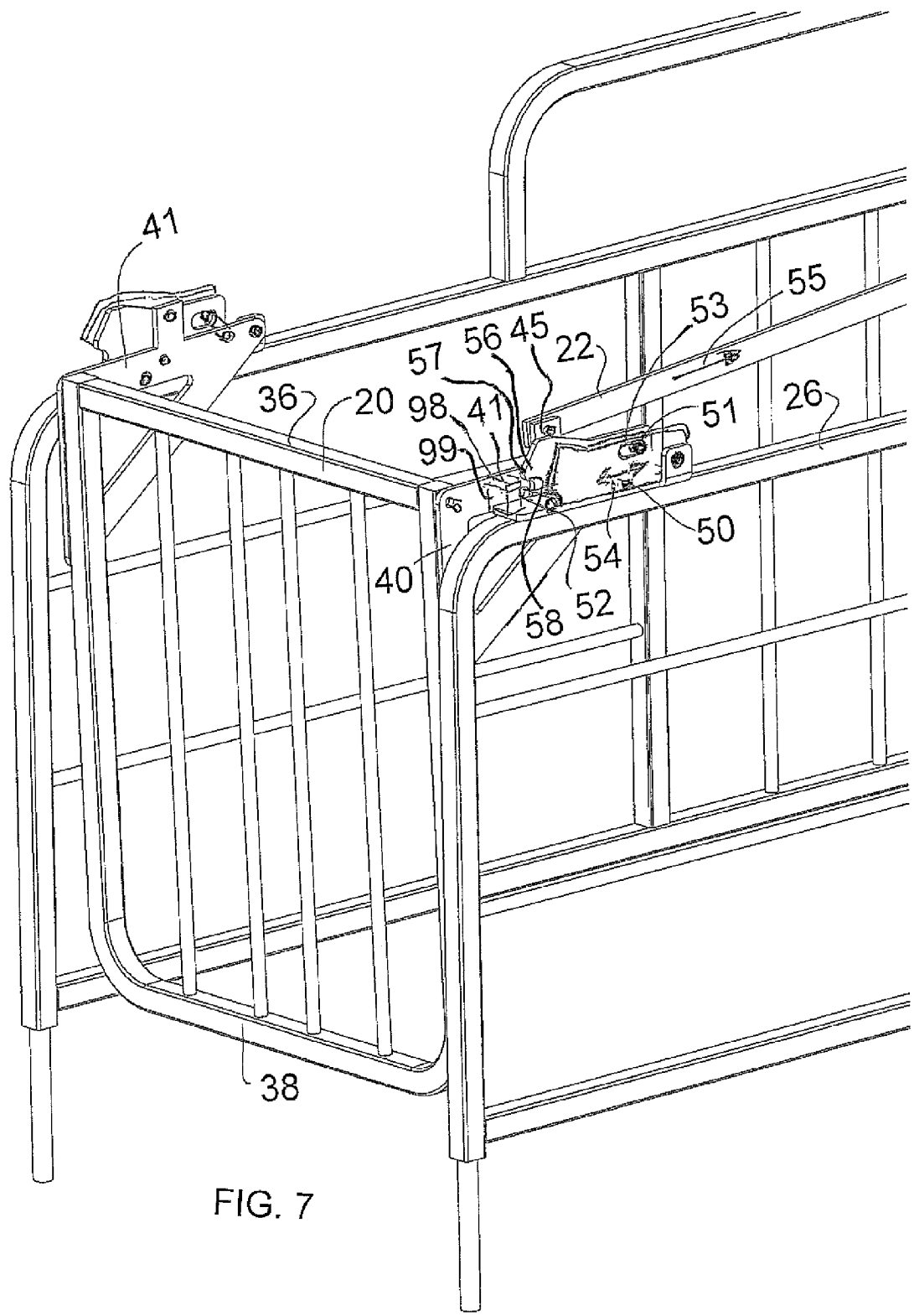
FIG. 7 is an isometric view the stall of FIG. 2 on an enlarged scale showing the latching arrangement.

As best shown in FIG. 7, the rear gate is pivotally mounted on a bracket 50 carried on the top rail 26. The rear gate 20 at the side 41 of the triangular mounting member of the rear gate carries a pivot pin 51 and a latching pin 52. The pivot pin 51 is received within a hole 53 of the bracket 50. The hole 53 is elongate to form a horizontal slot so that the pin 51 can pivot around its axis within the slot and also can move forwardly and rearwardly in the direction indicated by the arrow 54. In the position shown in FIG. 7, the weight of the front panel 21 provides a pulling action on the link 22 in the direction of the arrow 55. This is connected to the tab 45 on the side 41 of the rear gate thus pulling the pin 51 to the right hand end of the slot 53. In this position the pin 52 is pulled to a latch position underneath a latch member 56 at the end of the bracket 50. Thus the latch provides a nose 57 and a recess 58 so that the pin 52 is contained under the nose within the recess when the rear gate is in a down position.

In this down position with the pin 52 in the recess or receptacle 58, an animal pulling on the rear gate at the bottom rail 38 and attempting to enter the stall will act to attempt to pivot the gate upwardly so that the pin 52 holds the gate in the closed position. However the gate can be moved to an open position by a rearward force in the direction of the arrow 50 tending to push the pin 51 and the pin 52 rearwardly. This moving action is readily effected by a sow within the stall backing up with its rear end engaging the rear gate at a position raised from the bottom rail 38 toward the top rail 36 so that the main force on the gate is rearward rather than upward. This rearward force thus moves the pin 51 rearwardly allowing the pin 52 to be released from the receptacle 58 so that further pushing of the rear gate acts to pivot the rear gate about its pivot pin 51 and to move the rear gate upwardly to a raised position. While the pins 51 of the rear gate are mounted in the slots 53 of the bracket 50 allowing sliding movement, the corresponding pin 51A of the front panel is mounted in a hole which is round to prevent the sliding movement.

The initial rearward sliding movement of the rear gate this provides a pulling action on the link 22 which pulls on the front panel. As the front panel cannot slide on its brackets 50, it rotates around the pins 51A slightly in a counter-clockwise direction.

As the rear gate is unlatched, it can swing upwardly and this movement causes the link 22 to push the front gate downwardly about its corresponding pivot pin indicated at 51A so that the front panel 21 moves downwardly in front of the snout of the animal as it backs up tending to push the animal rearwardly so as to continue backing up movement. As the rear gate is pivots rearwardly, it moves to a raised position so that its bottom rail 38 rides on the back of the animal as the animal passes under the top rail 36. This forces the front panel downwardly into the fully closed position.

The mechanical arrangement of the link is selected so that the tendency of the structure is to be stable in either end position rather than in an intermediate position so that the front gate tends to fall into the vertical downward position as the rear gate is pivoted upwardly and to move into that position by the weight of the front gate.

With the animal backed out of the pen or stall, the animal is free to move in the rear area and re-enter the same stall or another stall at the choosing of the animal. When the animal enters an open stall, the animal moves toward the front of the stall so as to reach the feed within the trough and encounters the front gate or front panel 21 in its down position in advance of the trough. The animal wishing to reach the trough therefore pushes forwardly therefore lifting the front gate upwardly and pulling the rear gate downwardly behind the animal. The forward movement tends to push both gates and the link 22 forwardly so that the pivot pin of the rear gate moves forwardly in the slot 53.

For convenience of manufacture, it will be noted that the brackets and the gates are manufactured in the same construction even though there is no latch pin at the front gate and even though there is no connection to the tab 45A at the front gate since the link 22 connects to the apex of the triangular bracket 40 at the front gate. The components are therefore manufactured symmetrically from symmetrical pieces although the connections are not symmetrical.

In this way an arrangement is provided in which the animal when inside the stall is protected by the rear gate from further animals entering the stall and thus feels protected and contained within its own stall. However the animal can readily back up and open the rear gate to escape at its own volition from the stall to enter the free roaming area behind the stalls.

The latching arrangement which is provided by the forward and rearward sliding movement of the gate provides a simple mechanical linkage using movement of the pivot pin without the necessity for other latching components moved independently of the gate.

Figure 4:
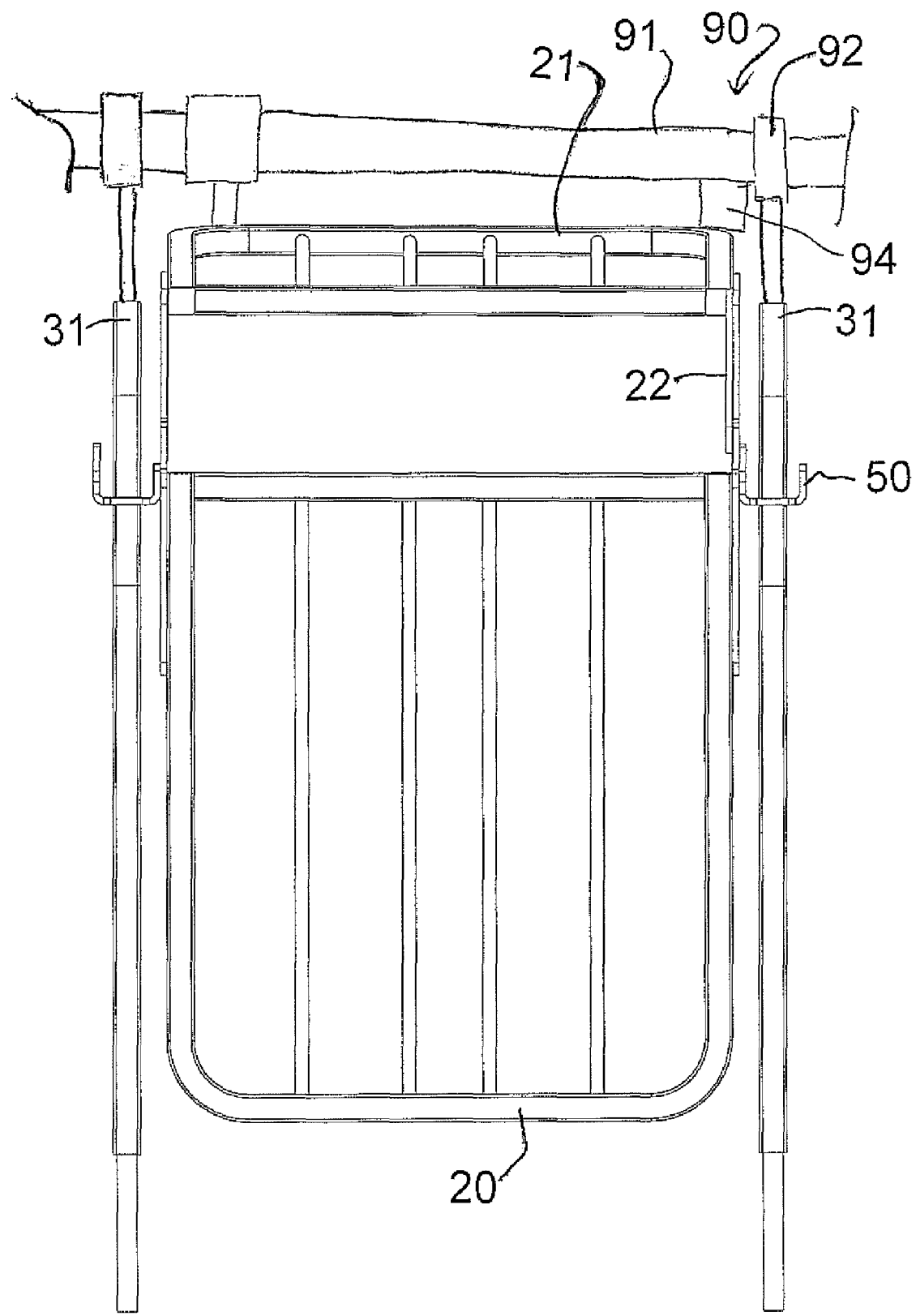
FIG. 4 is an end elevational view of the stall of FIG. 2 showing the rear gate in the closed position.
Figure 6:
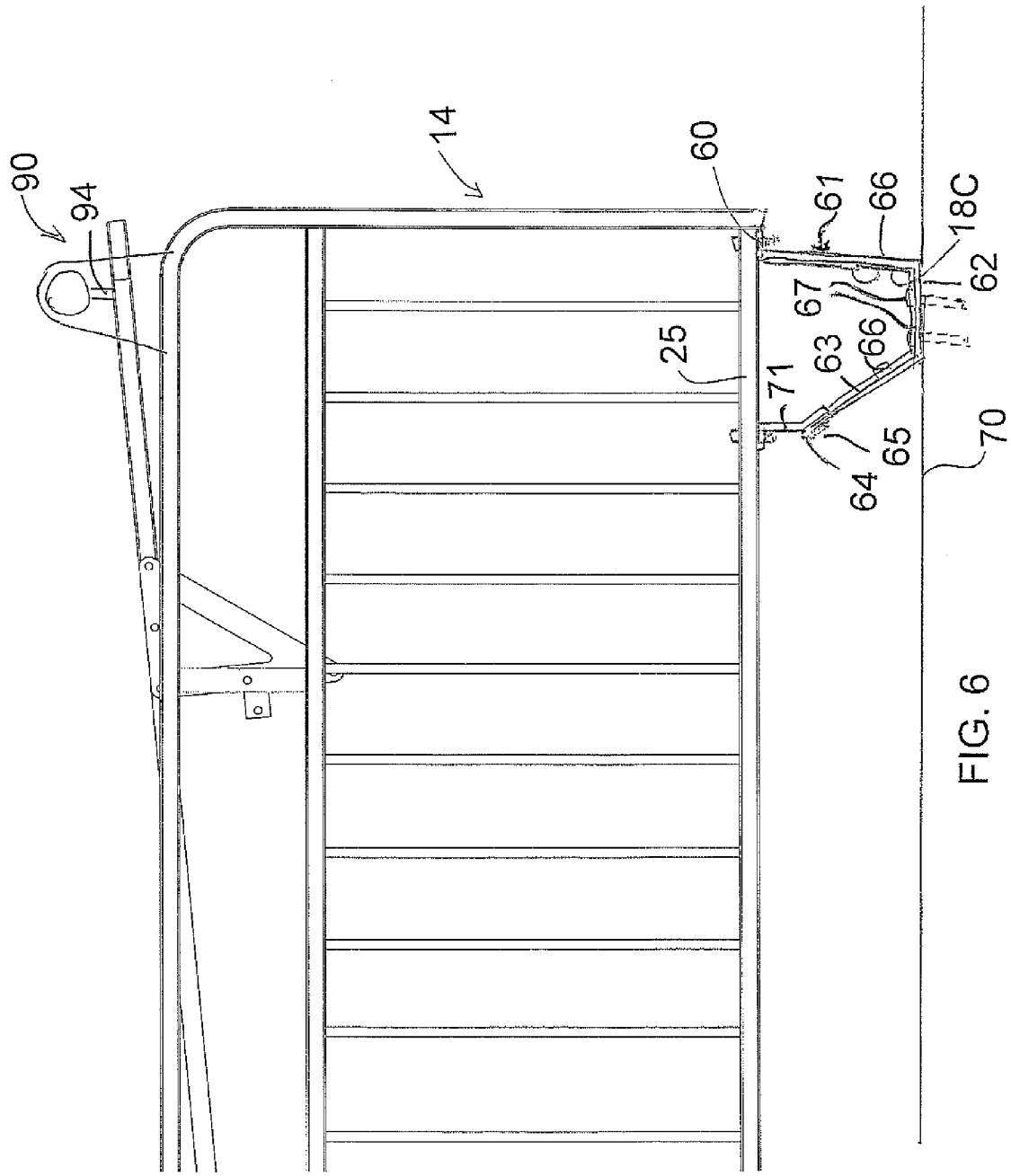
FIG. 6 is cross sectional view of the stall of FIG. 5 showing the co-operation of the side walls of the stall with the trough.

As shown in FIGS. 1, 4 and 6 there is provided a common linkage 90 operable by a supervising person for locking the rear gates of all of the stalls in the closed position. In one suitable example, this linkage 90 comprises a simple pipe 91 which extends across the top of all of the stalls at the front panel 21. The pipe 91 is carried in pipe supports 92 at some or all of the side walls 14 allowing the pipe to rotate about its axis. A lever 93 at one end can be operated by the supervising person to rotate the pipe. The pipe carries for each stall a lock bar 94 which can be turned from a release position projecting away from the front panel to a lock position butting the front panel. When in the lock position, the rear movement of the rear gate to unlatch the rear gate is prevented by the lock bar because the lock bar prevents the consequential rotation of the front panel around its pivot axis tending to slightly lift the front panel. Thus the locking linkage can be used to lock all of the rear gates against the unlatching movement thus retaining all of the rear gates locked. The lock pipe 91 also carries for each stall a sleeve 95 and a second lock bar 96. When the pipe is moved to the unlock position with the lock bars 94 pointing away from the front panels, an individual lock bar 96 on its sleeve 95 can be moved to the lock position by rotating the sleeve around the pipe. Thus individual selected stalls can be locked as selected by the person.

A rubber bumper 99 shown in FIG. 7 is located between a portion of the bracket 40 and the side rail 14 to accommodate shock loads as the rear gate drops to the closed position. This is slightly squeezed as the latch pin 52 enters the latch receptacle 58 to assist in holding the gate in the lowered position until released by the rearward movement effecting the unlatching action. The location of the rubber bumper is shown on a flange 98 at the side of the bracket 40 but it will be appreciated that many different locations can be found to conveniently locate the resilient bumper.

Figure 5:
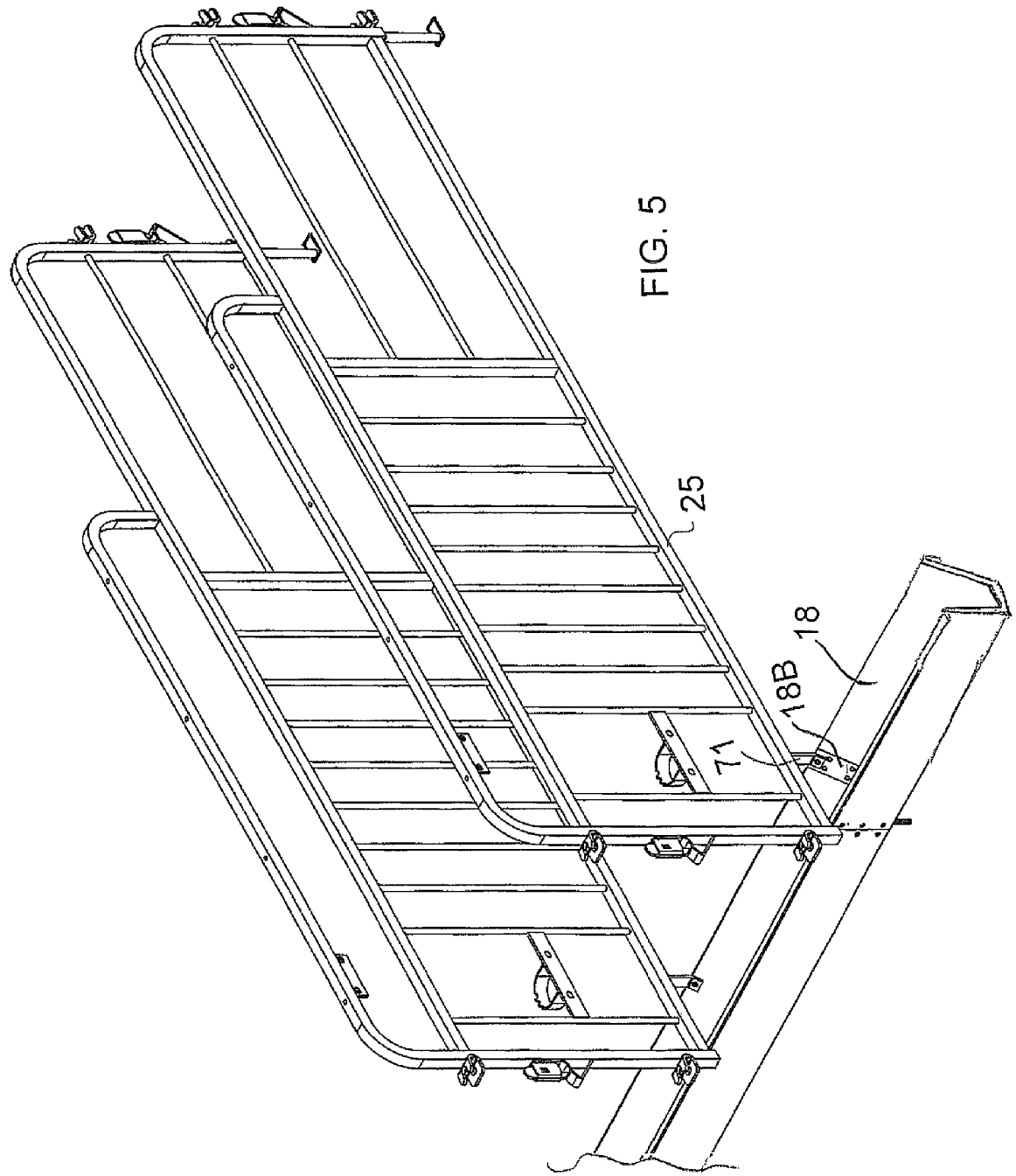
FIG. 5 is an isometric view of one stall of FIG. 1 with the gates omitted for convenience of illustration and showing the co-operation of the side walls of the stall with the trough.

Turning now to FIGS. 1, 5 and 6, the trough 18 is formed in a series of sections connected at joints 18B. Thus the trough is formed from individual trough sections of for example 10 feet in length which are bent to define the structure of the trough which is continuous from one edge through a base to the opposite edge. As best shown in FIG. 6, therefore, the trough sections are shaped to define a top flange 60 which is horizontal and extends outwardly of the trough from a vertical rear wall 61. At the bottom wall the rear wall is bent at a right angle to form a base 62 and at the front of the base the material is bent upwardly and forwardly to define an incline front wall 63 forming a top edge 64 and a down turned flange 65. Thus the animal can reach over the front edge 64 to access material at the base 62. Each section 18A of the trough is associated with a feed discharge device for depositing into the stall a required amount of feed for the sow. A water nipple for drinking by the animal can be located in the trough or at some other location so that the animal can take water as required either with the feed or separately from the feed. The water may be supplied at a separate location outside the stall or more preferably is located within the stall so as to encourage the animals to remain within the stalls and to only depart from the stalls on occasion for their own purposes. The front edge 64 of the trough is below the top flange 60.

The sections of the trough are connected at a butt joint 18B where a strap 18C is engaged over each trough section at the butt joint for a short length sufficient to provide room for a bead of sealant between the bottom surface of the strap and the inner or upper surface of each of the trough sections. The bead of sealant is sufficient to provide water proof connection between the two trough sections and the strap so that the trough can receive water supply. The trough sections are connected by fasteners 66 extending through the front and rear walls of the trough and acting to connect the troughs to the strap. At the base fasteners 67 engage through the strap, through holes in the trough sections at the butt joint and into the floor indicated at 70. Thus the trough is bolted or fastened to the floor 70 and the trough base of the two butting trough sections both sit directly on the floor with no underlying fasteners causing the base to be raised from the floor. The sheet metal defined in the trough thus lies flat over the floor along its full length. Each strap at the butt joints and at any other location required in between is fastened to the floor to maintain the trough fixed to the floor and in fixed position against movement in a direction forward and rearward relative to the floor.

In order to support the front end of the side wall 14, therefore, the bottom rail 25 of the side wall 14 is fastened to the trough at the flange 60 and at the flange 65. The height of the trough is selected relative to the height of the bottom rail 25 so that the bottom rail sits directly on the flange 60. As the front edge 64 is below the flange 60 an additional bracket 71 is provided between the bottom rail 25 and the inside surface of the front wall 63 at the top edge 64. The bracket 71 thus includes a vertical leg together with an inclined portion which lies along the inside surface of the top of the trough and is attached thereto either by bolted fasteners or by welding. The bracket 71 can be attached by bolted fasteners to the bottom rail 25 or can be welded thereto as required. Similarly the flange 60 can be bolted to or welded to the bottom rail 25. In this way the trough provides an effective support or anchor for the side walls defining the stalls so that the stalls are effectively located at the front rail and so as to minimize the quantity of materials necessary for defining the trough and for supporting the front end of the side walls 14.

Figure 8:
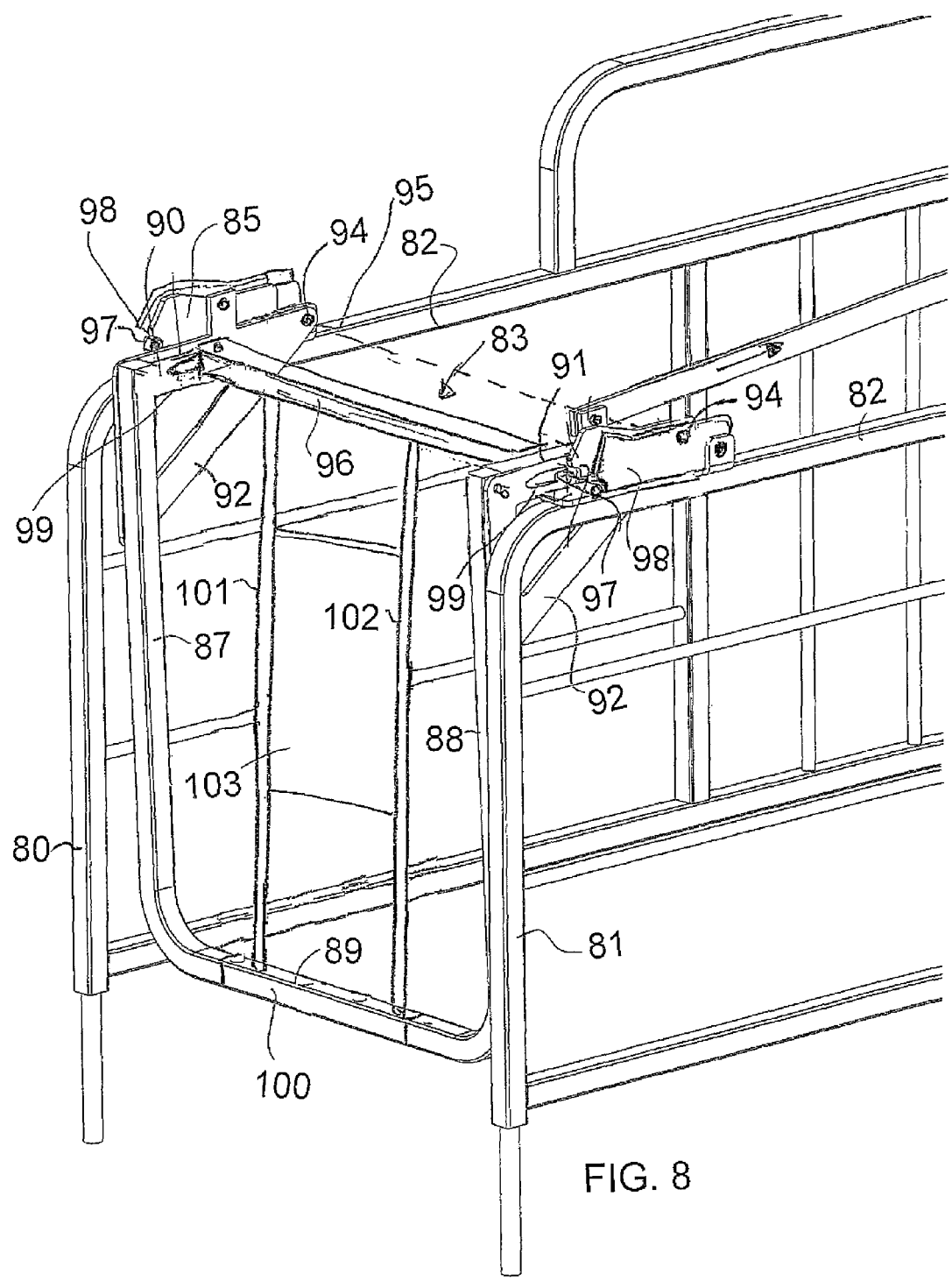
FIG. 8 is an isometric view similar to that of FIG. 7 showing a modified arrangement where a portion of the rear gate is movable rearwardly to effect release of the latch.
Figure 9:
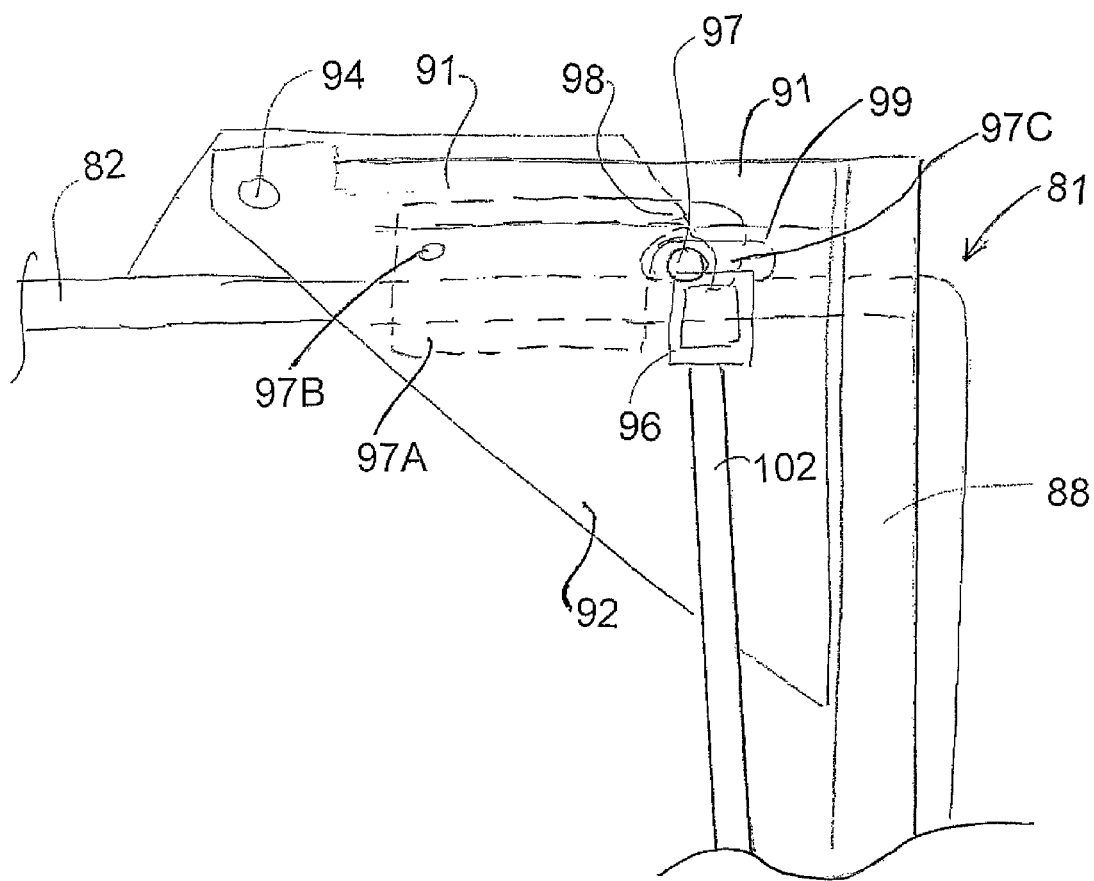
FIG. 9 is a cross sectional view of the arrangement of FIG. 8 showing a latch retaining member which can be used to hold the latch in the latched position.

An alternative arrangement of latch is shown in FIG. 8 where an alternative arrangement of the rear gate which utilizes the construction shown in the previous drawings except that the latching arrangement is modified to provide an easier movement requiring less force from the animal in the rearward movement.

Thus the construction of the stall is substantially as previously described including two side panels 80 and 81. Each side panel includes a top rail 82. The rear gate is indicated at 83 and is mounted for pivotal movement on a pair of brackets 85 and 86 each mounted on respective one of the two side rails 82. The rear gate includes two upstanding side posts 87 and 88 and a bottom cross member 89. At the top of the posts 87 88 is provided a rearwardly extending portion 90, 91 together with a triangular brace 92. Thus the rearwardly extending portion 90, 91 is fixed at right angles to the downwardly extending post 87, 88. The forward end of the portions 90 and 91 is provided a pivot pin 94 which engages into a location on the bracket 85, 86 defining a transverse horizontal pivotal axis 95 through the two pivot pins 94. Thus the gate when pushed rearwardly can pivot about the pivot axis 95 which is forward of the upper end of the posts 87 and 88 and allows the gates to swivel upwardly and slightly forwardly as previously explained.

In order maintain the gate in a latched closed position extending downwardly as shown in FIG. 8. The gate includes a latching bar 96 which can move forwardly and rearwardly relative to the main part of the gate. The latching bar 96 carries two latching pins 97 at opposed ends. The pins project outwardly beyond the ends of the bars and pass through a slot in the portion 90, 91 into engagement with a latching nose 98 of the bracket 85, 86. Thus when the latching bar 96 is moved to a forward position, the pins 92 are also moved forwardly along the slot 99 to engage under the nose 98.

The latching bar 96 carrying the pins 97 can pivot rearwardly about a bottom bar 100 which is connected to or forms part of the lower horizontal rail 89. The latching rail 96 is carried on a pair of vertical bars 101 and 102 which extend between the latching rail 96 and the bottom pivot rail 100. A plate 103 is connected between the posts 101 and 102 and provides a partial closure of the gate to reduce the possibility for sows behind the sow within the stall from gaining partial access but in addition the plate 103 provides an abutment against which the rear part of the sow engages if the sow moves rearwardly.

Thus when the sow is within the stall and has pushed the front gate upwardly, the rear gate is moved downwardly as previously explained and moves to the lowered position. In this position the latching bar 96 tilts forwardly in view of the fact that it is slightly inclined forwardly since the bar is forward of the pivot rail 100 and so the pins 97 are moved forwardly within the slots 99 to engage under the nose 98 of the latching bracket. In this position the gate is latched against a further sow attempting to lift the gate by placing its head within the gate or under the gate and providing upwardly movement.

However the sow within the stall simply can move rearwardly and press against the plate 103. The force required is very light since the only part is the gate 103 and the latching bar 96 thus allowing this movement to occur to release the latch and allow the remainder of the gate to be opened simply by the slow continuing a rearward movement.

This arrangement has the advantage over the arranged previously described in that the force required to release the latch is very much smaller and since the direction of movement that can be accommodated is relatively wide since there is a simple pivotal movement of the plate 103 around the bottom support rail 100.

Figure 10:
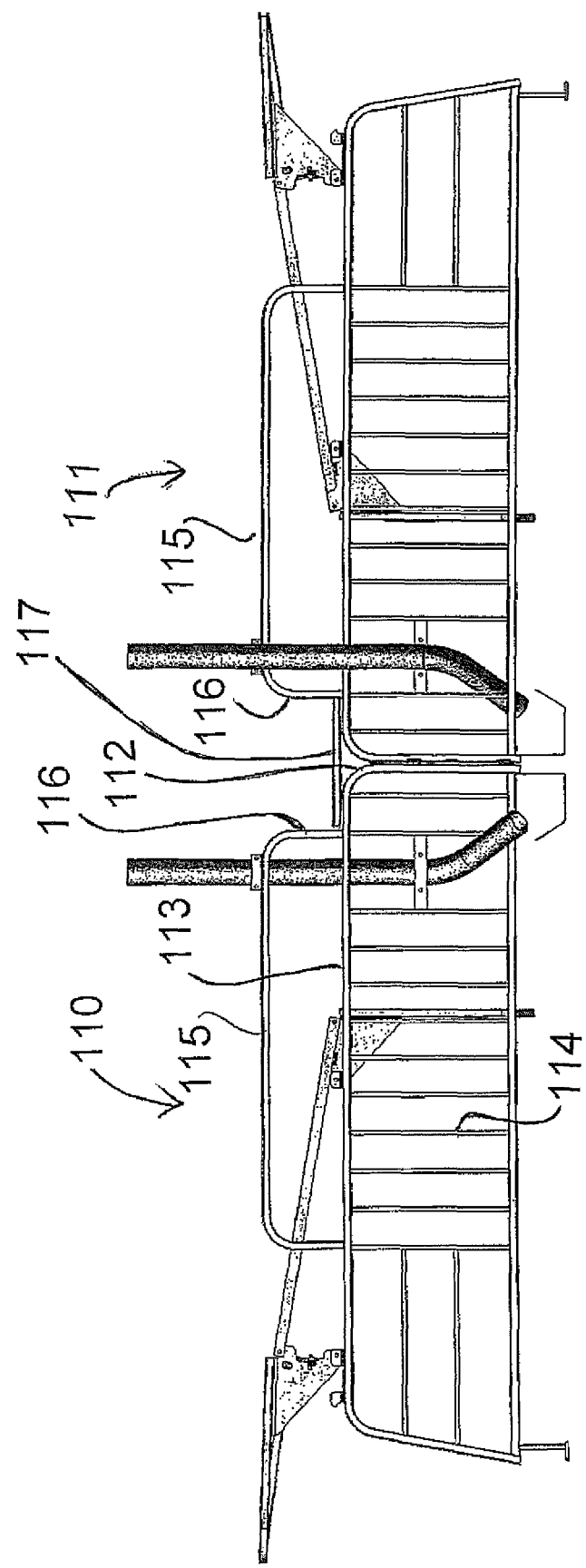
FIG. 10 is a cross sectional view of the apparatus of FIG. 1 when combined with a second symmetrical apparatus and including a walkway over the stalls.

Turning now to FIG. 10, two of the stalls as previously described are illustrated at 110 and 111 and it will be appreciated that these stalls form part of a row or a series of such stalls arranged side by side as previously described. In the previous arrangement, the stalls where intended to be located at the front at an alley to allow the responsible person to move along the alley and access the animals within the stalls.

In some cases the amount of room available for this installation is insufficient to provide enough space for the alley between the two stalls and yet provide a rear alley of sufficient size so that the animals can move freely within that alley.

In the arrangement shown in FIG. 10 this problem is overcome by butting the forward ends of the stalls 110 and 111 together at a butting line or junction 112. In this arrangement therefore the front panel previously described can be omitted and replaced simply by a divider sheet which is placed between the two stalls at the junction 112. The divider sheet may be a continuous imperforate sheet or may be formed by bars as required.

As previously described, the side walls of the stall include a rail 113 which carries vertical bars 114 and there is also provided a top rail 115 above the rail 113. Such stall sides are of a conventional construction in that the main part of the side wall is provided with the bars to prevent or inhibit the animal from moving sideways and also top rail is provided to inhibit the animal from attempting to climb.

As previously described the top rail extends along the full length of the stall side at the front to meet with the front end of the stall. In this arrangement, the top rail 115 terminates at a position prior to the junction 112 and includes a vertical leg 116 which extends downwardly to the rail 113. This leaves a space between the vertical legs 116 on which a walkway 117 can be provided simply by providing a series of planking or other support surfaces which are supported on the rail 113 symmetrically over the junction 112. Thus the walkway is below the top rail 115. The provision of the walkway does not interfere with the animal standing to access the trough at the front end. The mounting of the walkway at a height below the top rail 115 allows the walkway to accommodate both the animal beneath the walkway and to accommodate the responsible person walking on the walkway generally below a ceiling height of a conventional nature which might be of the order of 8 feet. Thus the walkway can be accommodated by both the person and the animal and yet provides the ability of the person concerned to move along the series of stalls of the animals to make any observations necessary and to take any actions that are necessary. This arrangement thus avoids the necessity for the alleyway between and allows the installation of this advantageous system within a space conventionally used for conventional single place stalls.

A latching holding member 97A is pivotally mounted on the gate on a pin 97B and includes a holding finger 97C. This is normally maintained raised allowing the sow to operate the gate as described above. However in the event that the operator requires the sow to be locked in, the holding member 97A is pivoted downwardly causing the finger 97C to hold the pin 97 in the forward latched position.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A containment apparatus for containing gestating sows comprising:
    a series of gestation stalls arranged in a row defined by a series of parallel side walls;
    each stall having a front closure panel for closing the side walls to form an enclosure shaped and dimensioned substantially to receive a single sow;
    an open alley along a rear of the row of stalls into which the sow can enter by backing out of the stall with a rear gate open so that the sows are free to move in the open alley at their volition and to enter the stalls through the rear entry;
    a trough at the front of the stall for providing feed for the sow in the stall;
    wherein the trough at the front of at least some of the stalls forms a common trough member extending across the stalls;
    wherein the trough member is fastened to a floor surface;
    and wherein the side walls of some of the stalls are attached to and supported by the common trough member.

2. The containment apparatus according to claim 1 wherein the common trough member includes a higher wall at the front of the stall and a lower wall over which the sow reaches to take feed from the trough, wherein the side walls are supported on and fastened to a flange along the higher wall and wherein there is provided a bracket extending downwardly from at least some of the side walls with a bottom end of the bracket fastened to the lower wall.

3. The containment apparatus according to claim 1 wherein the common trough member is formed from a plurality of trough sections connected end to end along the trough member and wherein each trough section is fastened to the next by fasteners which extend through the trough sections and engage into the floor to fasten the trough member to the floor.

4. A containment apparatus for containing gestating sows comprising:
    a series of gestation stalls arranged in a row defined by a series of parallel side walls;
    each stall having a front closure panel for closing the side walls to form an enclosure shaped and dimensioned substantially to receive a single sow;
    an open alley along a rear of the row of stalls into which the sow can enter by backing out of the stall with a rear gate open so that the sows are free to move in the open alley at their volition and to enter the stalls through the rear entry;
    a trough at the front of the stall for providing feed for the sow in the stall;
    wherein the trough at the front of at least some of the stalls forms a common trough member extending across the stalls;
    wherein the trough member is fastened to a floor surface;
    and wherein the common trough member is formed from a plurality of trough sections connected end to end along the trough member and wherein each trough section is fastened to the next by fasteners which extend through the trough sections and engage into the floor to fasten the trough member to the floor.

5. A containment apparatus for containing gestating sows comprising:
    a first series of gestation stalls arranged in a row defined by a series of parallel side walls arranged to form a series of enclosures shaped and dimensioned substantially to receive a single sow;
    a first open alley along a rear of the row of stalls of the first series into which the sow can enter by backing out of the stall with a rear gate open so that the sows are free to move in the first open alley at their volition and to enter the stalls of the first series through the rear entry;
    a first trough at the front of the stalls of the first series for providing feed for the sow in the stall;
    a second series of gestation stalls arranged in a row defined by a series of parallel side walls arranged to form a series of enclosures shaped and dimensioned substantially to receive a single sow;
    a second open alley along a rear of the row of stalls of the second series into which the sow can enter by backing out of the stall with the rear gate open so that the sows are free to move in the second open alley at their volition and to enter the stalls of the first series through the rear entry;
    a second trough at the front of the stalls of the first series for providing feed for the sow in the stall;
    the first series of stalls being arranged facing the second series of stalls such that the front of the first series butts with the front of the second series at a junction therebetween so that the first and second rear alleys are opposed and spaced by the two series of stalls;
    a divider member located between the front of the first stalls and the front of the second stalls at the junction therebetween to maintain the sows therein separate;
    and a walkway elevated above the floor located along the junction between first and second series of stalls.

6. The containment apparatus according to claim 5 wherein the walkway is supported on the side walls of the stalls so as to bridge the junction between the stalls and sit partly on the first series and partly on the second series.

7. The containment apparatus according to claim 6 wherein the side walls of the stalls have a reduced height section at the junction on which the walkway is supported.

8. The containment apparatus according to claim 6 wherein the walkway is supported at a height lower than a top rail of the side walls of the stalls.

* * * * *